US008615880B2

(12) United States Patent
Stevenson

(10) Patent No.: US 8,615,880 B2
(45) Date of Patent: Dec. 31, 2013

(54) JETSTACK PLATE TO PLATE ALIGNMENT

(75) Inventor: James M. Stevenson, Tualatin, OR (US)

(73) Assignee: Xerox Corporation, Norwalk, CT (US)

( * ) Notice: Subject to any disclaimer, the term of this patent is extended or adjusted under 35 U.S.C. 154(b) by 1019 days.

(21) Appl. No.: 12/689,215

(22) Filed: Jan. 18, 2010

(65) Prior Publication Data

US 2010/0118296 A1 May 13, 2010

Related U.S. Application Data

(62) Division of application No. 11/738,581, filed on Apr. 23, 2007, now Pat. No. 7,669,985.

(51) Int. Cl.
*B21D 53/76* (2006.01)
*B23P 17/00* (2006.01)
*B41J 2/015* (2006.01)

(52) U.S. Cl.
USPC ............................................ 29/890.1; 347/20

(58) Field of Classification Search
USPC ........ 29/890.1, 830, 831, 832, 846, 847, 852; 347/20, 54, 63, 68, 70, 71, 72; 257/448, 429, 431; 250/396 R
See application file for complete search history.

(56) References Cited

U.S. PATENT DOCUMENTS 4,642,160 A * 2/1987 Burgess .......................... 216/18
5,499,444 A * 3/1996 Doane et al. .................... 29/830
6,270,203 B1 * 8/2001 Kitahara et al. ................ 347/70
6,601,949 B1 * 8/2003 Kitahara .......................... 347/70
6,761,436 B2 * 7/2004 Tobita et al. .................... 347/70
6,893,117 B2 * 5/2005 Tanaka et al. ................... 347/70
6,902,262 B2 * 6/2005 Tanaka et al. ................... 347/68
6,928,726 B2 * 8/2005 Zollo et al. ...................... 29/832
6,929,354 B2 * 8/2005 Kitahara .......................... 347/70
7,249,413 B2 * 7/2007 Kanada et al. ............... 29/890.1
7,290,867 B2 * 11/2007 Kobayashi et al. ............. 347/71
7,422,313 B2 * 9/2008 Umeda et al. ................... 347/57
7,604,330 B2 * 10/2009 Enomoto et al. ................ 347/71
7,669,985 B2 * 3/2010 Stevenson ........................ 347/68
7,748,833 B2 * 7/2010 Silverbrook ..................... 347/85

* cited by examiner

*Primary Examiner* — David Angwin
(74) *Attorney, Agent, or Firm* — Marger Johnson & McCollom PC

(57) ABSTRACT

An apparatus has a first plate having a first array of holes, with a first plate alignment hole having a smaller size than the other holes in the array, a second plate having a second array of holes to be alignable to the first array of holes, a second plate alignment hole having a smaller size than the other holes in the array, and the first plate alignment hole and the second plate alignment hole having different positions. A method of aligning plates provides a first plate having a top and bottom and first array of holes including a first plate alignment hole having a size smaller than the other holes in the first array, places a second plate having a second array of holes on the top of the first plate such that the first array of holes and the second array of holes align, directs light at the bottom of the first plate, locates a profile of the first plate alignment hole in the second array of holes to verify alignment.

9 Claims, 4 Drawing Sheets

JETSTACK PLATE TO PLATE ALIGNMENT

CROSS-REFERENCE TO RELATED APPLICATIONS

This application is a divisional of U.S. patent application Ser. No. 11/738,581, filed Apr. 23, 2007, which is hereby incorporated by reference herein in its entirety.

BACKGROUND

Ink jet printers generally have a 'jet stack,' a stack of brazed steel plates that have manifolds to route the ink from ink reservoirs to an array of jets from which ink is dispensed. The jet stack may consist of several plates and the plates need to align correctly for proper functioning of the ink jet printer.

Current implementations of jet stack plates use a single hole on each plate, with each successive plate from an aperture plate to the diaphragm plate having a hole of a larger diameter. The diaphragm plate resides the closest to the jet, generally a transducer receives a signal to activate, as it activates it depresses the diaphragm and pushes a droplet of ink through a jet. Ideally, as the plates are stacked together, the holes would be perfectly concentric, but variation almost always occurs.

The variation is measured with an automated video system. Poor contrast between the hole edge and the plate to which the current plate is bonded from below results in erroneous measurements. The plates are shiny, stainless steel and the hole and surface quality vary. The automated video system uses top lighting and it becomes difficult for the system to sort out reflections and locate the hole edges to determine if the holes align correctly. Erroneous measurements then occur.

If caught, the erroneous measurements require re-measuring manually, which consumes time and resources. If they erroneous measurements are not caught, the jet stack plates do not align correctly. The jet stack will still operate but at a lower efficiency. Further, the management of the process flow is affected, because the error in the process is not corrected. In some instances, the re-measuring and manual alignment process is skipped entirely, being deemed as too high a cost for the results.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
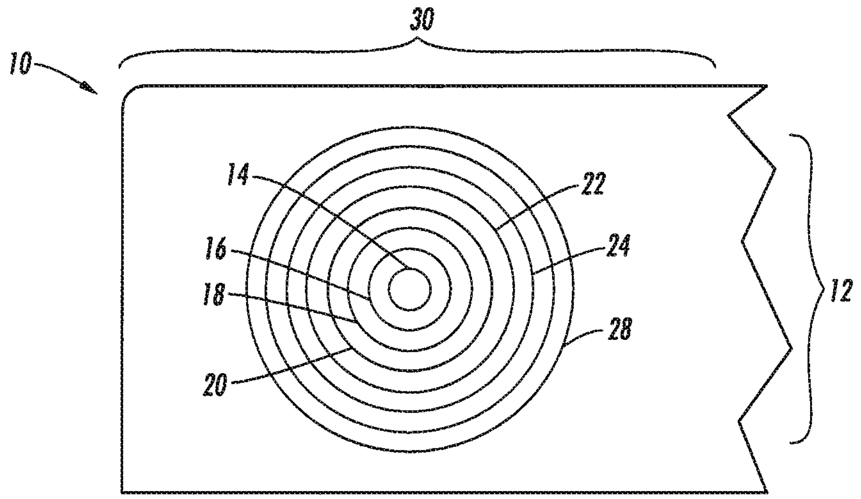
FIG. 1 shows a cone alignment feature on a stack of plates.

FIG. 1 shows an example of a stack of plates aligned using cone alignment features. Each successive plate in the stack has an alignment hole that is larger than the previous plate in the stack. As used here, a hole does not have any particular shape or design but penetrates from one surface of the plate to the other. The holes here are round, but need not be and no limitation in the claims is intended nor should it be inferred.

The top plate in the stack 10 has an alignment hole 28 in the alignment region 12 that has the largest diameter of the alignment holes. Alignment hole 26 resides on the previous plate in the stack, viewing this stack as the top plate being the last plate placed in the stack with the previous plates being placed prior. Holes 24, 22, 20, 28, 16 and 14 all belong to previous plates in the stack. Each subsequent plate in the stack has a larger diameter, allowing the edges of the holes from the previous plates to be seen from the top. The series of holes form a 'cone' type structure and may be referred to here as cone alignment.

During the stacking and alignment process, a vision system, not shown, analyzes arcs from around the edges of the holes to determine if the holes are aligned. The vision system views the plates from a perspective at the 'top' of the stack and uses a top light for illumination. The generally stainless steel plates reflect the light up into the vision system, making analysis of the edges of the holes and their positions difficult and inaccurate. As a result, operators must manually align and check the plates. This process takes a long time and the manufacturing process usually just skips the alignment process due to the inefficiency.

Figure 2:
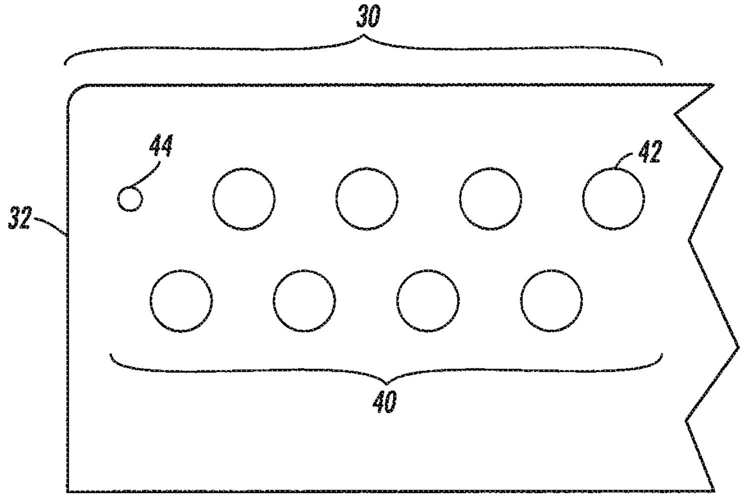
FIG. 2 shows a plate having a plate alignment hole in a first position.

FIG. 2 shows an embodiment of a plate 32 having an alignment feature using an array of holes 40. The array of holes 40 uses a similar amount of space 30 as the cone alignment features did in the embodiment of FIG. 1. In the array of holes 40, several holes have the same diameter, such as 42, and one hole in the array has a smaller diameter such as 44. Each plate used in the stack has a small diameter hole such as 42, located in a different position.

Figure 3:
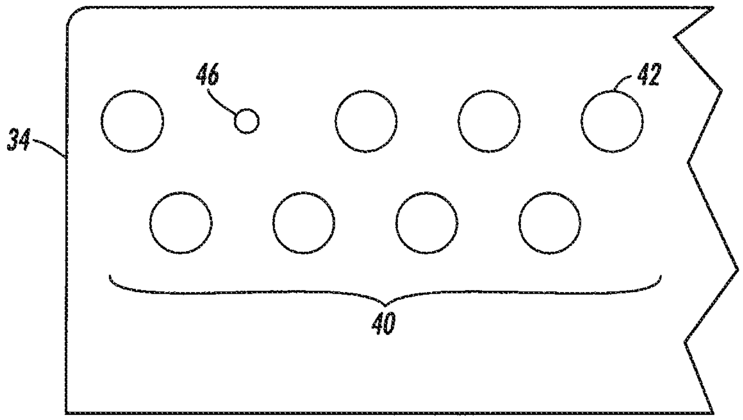
FIG. 3 shows a plate having a plate alignment hole in a second position.
Figure 4:
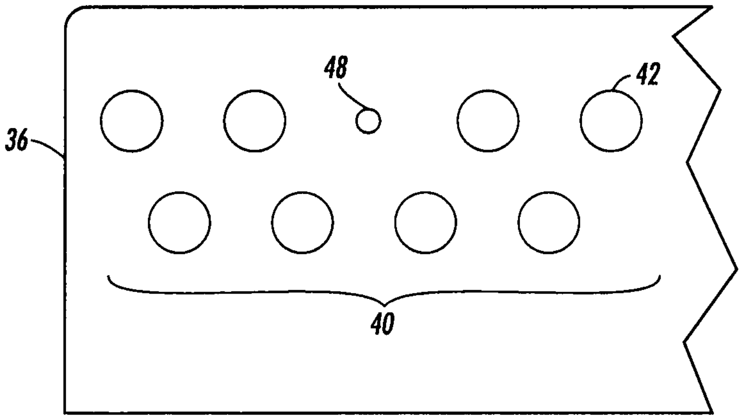
FIG. 4 shows a plate having a plate alignment hole in a third position.

FIGS. 3 and 4 show further examples of other plates in the stack. Plate 34 of FIG. 3 has an array of holes 40 having mostly holes of larger diameter such as 42, Plate 34 has a smaller diameter hole 46 located in a different position than the smaller diameter hole of plate 32 of FIG. 2. Similarly, FIG. 4 shows a plate 36 having a smaller diameter hole 48 located in a different position from that of plates 34 or 32.

Figure 5:
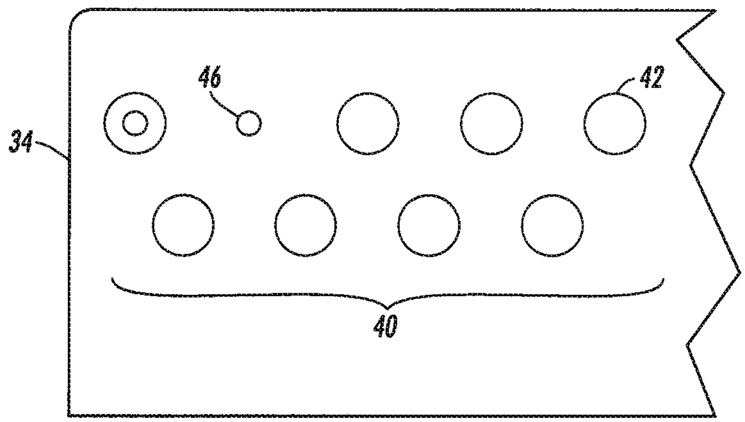
FIG. 5 shows the top of a stack of two plates with the top plate alignment hole being in the second position.
Figure 6:
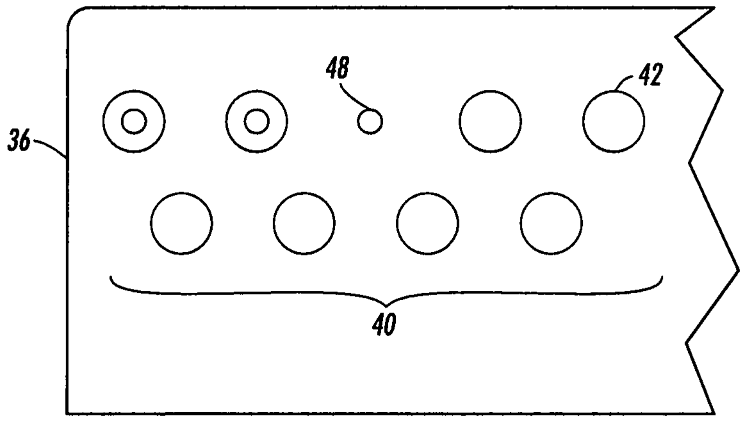
FIG. 6 shows the top of a stack of three plates with the top plate alignment hole being in the third position.

FIGS. 5 and 6 show examples of a profile image resulting from stacking the plates having arrays of holes, where each plate has a hole in the array smaller than the other holes. FIG. 5 shows a top view of plate 34 stacked on top of plate 32. Of course, the 'top' here is an arbitrary selection, as the plates could be viewed from the other side as well.

The profile image presented in FIG. 5 is a result of a bottom light source shining up through the holes in the array. Using a bottom light source alleviates the issues resulting from the reflectivity of stainless steel and other metals from which the plates may be manufactured. The hole 46 appears very sharply contrasted from the other holes in the array as a white spot on what would be a dark field. The hole 44 would also appear as a white spot on a dark field, the surrounding larger hole from plate 34 would not be as visible as shown here, but is shown for discussion purposes. The vision system knows generally in what region the white spot should appear and can locate the spot within a particular coordinate range to differentiate between the spot 46 and the similar spot 44.

In addition, the positions of the smaller holes from plate to plate may not be sequentially located as is shown in FIGS. 2-4. To allow the vision system a greater distance between similar spots, the desired spot location may be located farther away from other spots that may present a similar profile to the vision system.

FIG. 6 shows a profile of the plate 36 stacked on top of the plates 32 and 34, hidden in this image. The hole 48 again would appear as a bright spot on a dark field in a general location already 'known' by the vision system. This allows the vision system to differentiate between the spots appearing to the left of the spot of interest, those spots being the result of smaller diameters holes in the previous plates in the stack.

In this manner, the vision system can locate the edges of the spot of interest and measure the distance of that spot from the other spots to determine if the plates align correctly. The bottom lighting allows higher contrast at the edge of the holes. This in turn allows the vision system to have more easily located edges to analyze to determine the position of the holes relative to other holes.

The arrays of holes may reside at one end of the jet stack plates, such as the left end. For higher precision, a second array of holes may reside on each plate at the end opposite the first end, such as the right end. This ensures a higher precision in placing the plates into alignment.

An experiment used a set of chemically-etched test plates to demonstrate the new methodology. An automated coordinate measuring machine (CMM) system used a newly created program to measure locations of the individual small diameter holes within the arrays at both ends of a printer jet stack. As mentioned earlier, a printer jet stack is a set of plates having various features for managing ink flow from a reservoir to an outlet jet that deposits drops of ink on a print substrate such as paper. The experiment used the same low-level bottom lighting setting for every hole measurement.

Excluding set up, the start to finish run time for the procedure to align the plates was 1 minute and 45 seconds. This time includes measuring a left and right array at the ends of the jet stack. The experiment included a focus step for every feature, which may be optional. The experiment did not do a full jet stack alignment, but estimates including the extra plate-plate alignments for a full jet stack project a full alignment process to take approximately 2 minutes. This uses less than half the time than previous methods and no re-measurements will be required.

Figure 7:
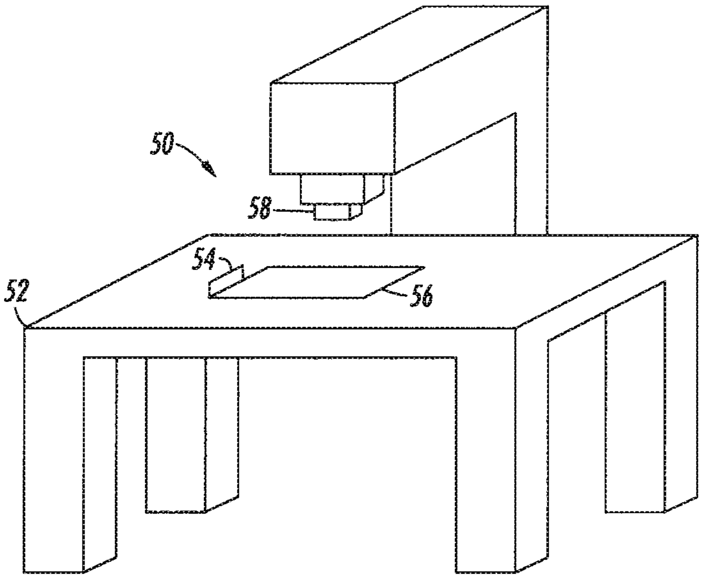
FIG. 7 shows a cross-sectional view of 3 holes in an array.

A side view of a stack of aligned plates is shown in FIG. 7. Plate 32 forms the 'bottom' of the stack, with hole 44 having a smaller diameter than the other holes in plate 32. The light used in the alignment system would come from 'underneath' plate 32, from the lower portion of the figure up towards the stack of plates. Plate 34 lies in the middle, with small diameter hole 46 and plate 36 lies on the top of the stack, with small diameter hole 48.

In this manner, alignment of the plates of the jet stack occurs with more precision and less time than other processes. While the discussion here focused on the alignment of plates for a print head jet stack, the alignment process may apply to any type of alignment needed for stacks of plates.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of aligning jetstack plates, comprising:

providing a first plate having a top and bottom and first array of holes, the first plate including an alignment hole having a size smaller than the other holes in the first array;

placing a second plate, the second plate having a second array of holes, on the top of the first plate such that the first array of holes of the first plate and the second array of holes of the second plate are concentrically aligned, and where each successive plate in a stack of plates has at least one alignment hole that is larger than the alignment hole in any previous plate in the stack of plates;

directing light at the bottom of the first plate;

locating a profile of the first plate alignment hole in the second array of holes; and verifying alignment of the second plate to the first plate by a position of the profile.

2. The method of claim 1, further comprising adjusting alignment of the second plate until the profile matches a desired profile.

3. The method of claim 1, wherein the second array of holes includes a second plate alignment hole.

4. The method of claim 3, further comprising the placing, directing, locating and verifying for multiple plates, each plate having an array of holes alignable to the first and second arrays of holes, each array of holes having a plate alignment hole in a unique position.

5. The method of claim 1, wherein locating a profile further comprises locating a bright spot against a dark field, the dark field being one of the array of holes in the second plate.

6. The method of claim 1, wherein locating a profile further comprising locating a profile using a vision system.

7. The method of claim 5, wherein verifying alignment further comprises measuring a distance from the bright spot to an adjacent hole in the array of holes.

8. The method of claim 1, wherein the arrays of holes are formed by chemical etching.

9. The method of claim 1, wherein each plate has two arrays, at first and second ends of the plate, and the method is repeated for each end of the plate.

* * * * *